(12) United States Patent
Murata et al.

(10) Patent No.: US 9,886,502 B2
(45) Date of Patent: *Feb. 6, 2018

(54) PROVIDING SIMILAR CONTENT WITH SIMILAR PLAYBACK RATES

(75) Inventors: Yuki Murata, Tokyo (JP); Soichiro Atsumi, Shizuoka (JP)

(73) Assignee: Sony Corporation (JP)

(*) Notice: Subject to any disclaimer, the term of this patent is extended or adjusted under 35 U.S.C. 154(b) by 1043 days.

This patent is subject to a terminal disclaimer.

(21) Appl. No.: 13/469,579

(22) Filed: May 11, 2012

(65) Prior Publication Data

US 2012/0226783 A1 Sep. 6, 2012

Related U.S. Application Data

(63) Continuation of application No. 12/290,841, filed on Nov. 4, 2008, now Pat. No. 8,195,639.

(30) Foreign Application Priority Data

Nov. 9, 2007 (JP) ................................ P2007-292584

(51) Int. Cl.
G06F 17/30 (2006.01)
(52) U.S. Cl.
CPC .. *G06F 17/30749* (2013.01); *G06F 17/30017* (2013.01); *G06F 17/30743* (2013.01)
(58) Field of Classification Search
CPC ......... G06F 17/30864; G06F 17/30011; G06F 17/30699

(Continued)

(56) References Cited

U.S. PATENT DOCUMENTS 5,561,718 A * 10/1996 Trew .................... A61B 5/1176
382/118
5,991,429 A * 11/1999 Coffin ................ G06K 9/00255
382/118

(Continued)

FOREIGN PATENT DOCUMENTS

JP 2002123272 A 4/2002
JP 2002287773 A 10/2002

(Continued)

OTHER PUBLICATIONS

Collins, Introduction to Computer Vision date unknown [captured on Dec. 9, 2015], Penn State University, http://www.cse.psu.edu/~rtc12/CSE486/.*

(Continued)

*Primary Examiner* — Jason Liao
(74) *Attorney, Agent, or Firm* — Lerner, David, Littenberg, Krumholz & Mentlik, LLP

(57) ABSTRACT

A system and method in which metadata associated with content data received from an information processing apparatus is used in determining related content data that includes a similar feature as the content data. The related content data may be determined from a channel in which the content data belongs according to a playback rate determination by the information processing apparatus of give content data used in determining the similar feature as the feature in the content data. The related content data may then be transmitted to the information apparatus, which may selectively playback the content data and the related content data.

7 Claims, 10 Drawing Sheets

(58) Field of Classification Search
USPC .......................................................... 707/711
See application file for complete search history.

(56) References Cited

U.S. PATENT DOCUMENTS

| | | | |
|---|---|---|---|
| 6,698,653 B1* | 3/2004 | Diamond ........... | G07C 9/00087 235/375 |
| 9,680,945 B1* | 6/2017 | Treves .................... | H04L 67/22 |
| 2004/0199657 A1* | 10/2004 | Eyal et al. .................... | 709/231 |
| 2005/0211077 A1 | 9/2005 | Kobayashi | |
| 2006/0120624 A1* | 6/2006 | Jojic ................. | G06F 17/30843 382/284 |
| 2006/0206478 A1* | 9/2006 | Glaser et al. ...................... | 707/5 |
| 2006/0233522 A1* | 10/2006 | Hiroi et al. ...................... | 386/95 |
| 2007/0265979 A1* | 11/2007 | Hangartner ...................... | 705/59 |
| 2007/0288470 A1* | 12/2007 | Kauniskangas et al. ....... | 707/10 |
| 2009/0077084 A1* | 3/2009 | Svendsen ........... | G06F 17/3002 |
| 2009/0164641 A1* | 6/2009 | Rogers et al. ................. | 709/227 |
| 2011/0022620 A1* | 1/2011 | Woods .................. | H04N 5/445 707/769 |

FOREIGN PATENT DOCUMENTS

| | | |
|---|---|---|
| JP | 2004005849 A | 1/2004 |
| JP | 2004-054023 A | 2/2004 |
| JP | 2005-275068 A | 10/2005 |
| JP | 2005276311 A | 10/2005 |
| JP | 2005284574 A | 10/2005 |
| JP | 2006012257 A | 1/2006 |
| JP | 2006146729 A | 6/2006 |
| JP | 2007035162 A | 2/2007 |
| JP | 2007149313 A | 6/2007 |
| JP | 2007-184773 A | 7/2007 |
| JP | 2007226880 A | 9/2007 |

OTHER PUBLICATIONS

Collins, Lecture 01: Intro to Computer Vision "Fall 2007", Penn State University, http://www.cse.psu.edu/~rtc/CSE486/lecture01.pdf.*

Mazzoni et al., Melody Matching Directly from Audio 2001, $2^{nd}$ Annual International Symposium on Music Informational Retrieval, pp. 73-82.*

Stewart, Detecting Terrorist Surveillance Mar. 7, 2012, Straftor Enterprises, LLC, https://www.stratfor.com/weekly/detecting-terrorist-surveillance.*

Timecode Media Handler Functions Jan. 10, 2006, Apple Computer, https://developer.apple.com/library/content/documentation/QuickTime/RM/MovieBasics/MTEditing/I-Chapter/9TimecodeMediaHandle.html.*

Marceau Cnudde Jan. 21, 2016, quora.com, What is the real application of the playback rate/speed feature in YouTube under the settings icon?, https://www.quora.com/What-is-the-real-application-of-the-playback-rate-speed-feature-in-YouTube-under-the-settings-icon.*

Office Action from Japanese Application No. 2007-292584, dated Jul. 3, 2012.

Chang, S. et al., Columbia University TRECVID-2005 Video Search and High-Level Feature Extraction, Digital Video and Multimedia Lab, Columbia University http://www.ee.columbia.edu/dvmm Oct. 28, 2005 <http://www.ee.columbia.edu/dvmm%20Oct.%2028th%202005>.

Snoek, C. et all, Early versus Late Fusion in Semantic Video Analysis, Multimedia '05 Proceedings of the 13th annual ACM international conference on Multimedia, 2005, pp. 399-402.

* cited by examiner

FIG.8

| MUSIC TITLE | ARTIST NAME | ALBUM TITLE | CHANNEL | PRIORITY | URL |
|---|---|---|---|---|---|
| ○○○ | △△△ | ○×△ | 201 | 1 | http://www.amazom.com/aaa... |
| ××× | □□□ | ×□○ | 202 | 2 | http://www.amazom.com/aab... |
| ... | ... | ... | ... | ... | ... |

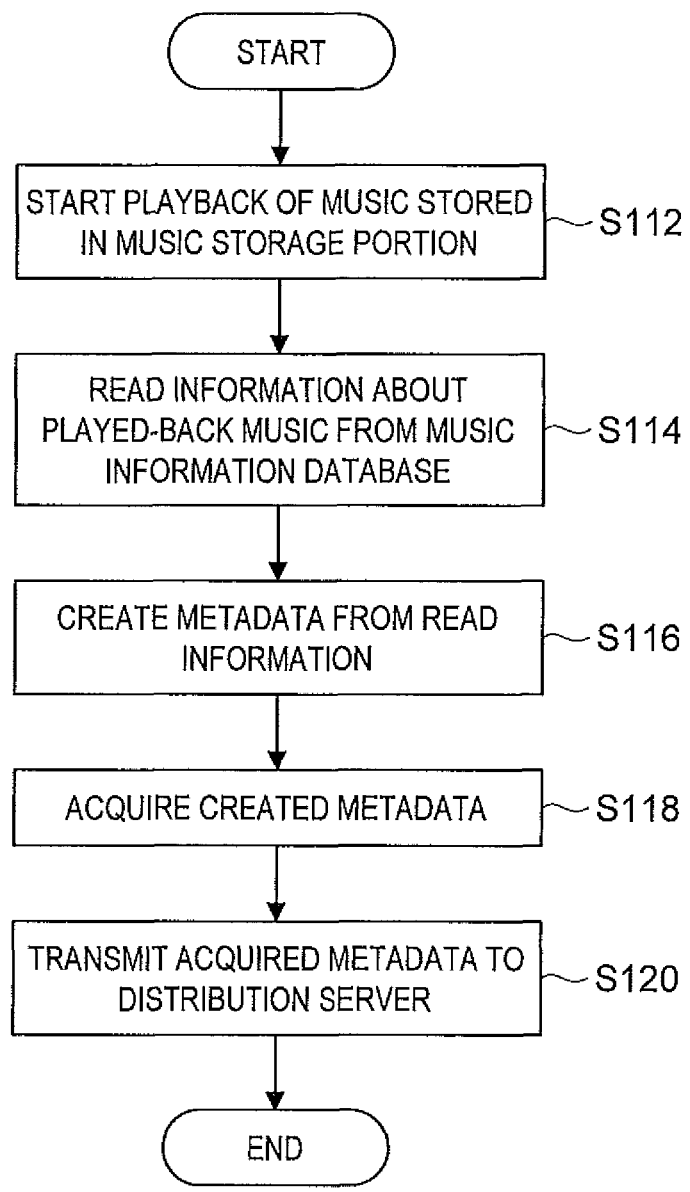

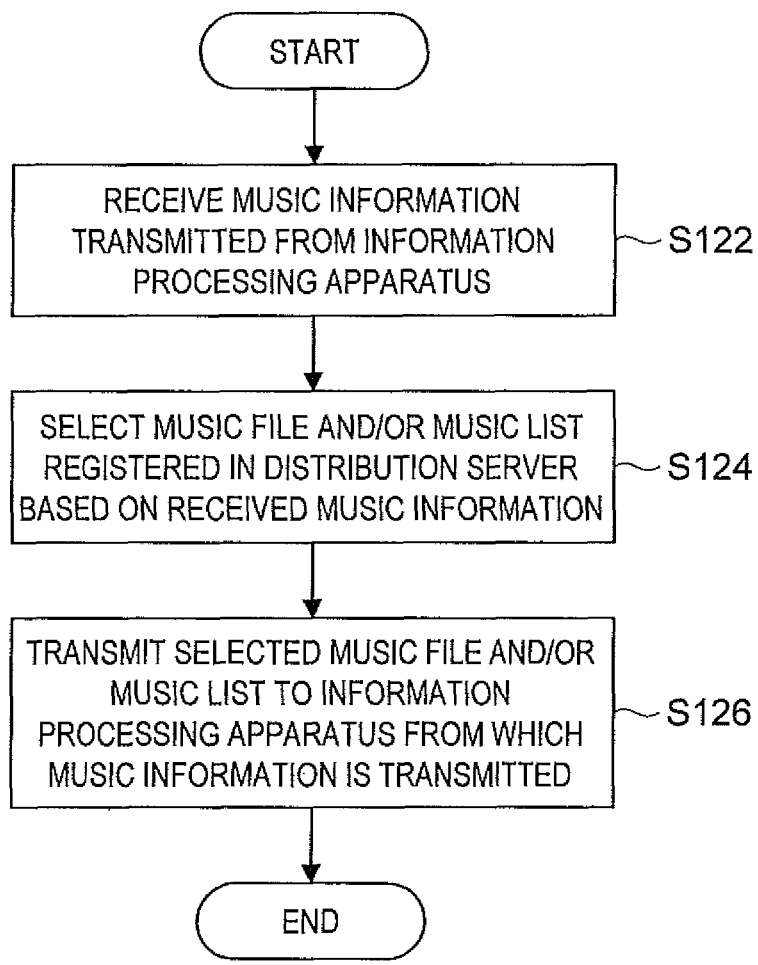

PROVIDING SIMILAR CONTENT WITH SIMILAR PLAYBACK RATES

CROSS-REFERENCE TO RELATED APPLICATIONS

The present application is a continuation of U.S. patent application Ser. No. 12/290,841, filed Nov. 4, 2008, which claims priority from Japanese Patent Application No. JP 2007-292584, filed in the Japanese Patent Office on Nov. 9, 2007, the disclosures of which are incorporated herein by reference.

BACKGROUND OF THE INVENTION

Field of the Invention

The present invention relates to an information processing apparatus, a music distribution system, a music distribution method and a computer program.

Description of the Related Art

With a recent trend toward digital audio players, the number of music download distribution sites that distribute music files over the Internet is growing. Further, the variety of music playback applications for playing back music on a personal computer is increasing.

A music download distribution site and a music playback application often have close relationship with each other, such as that a music download distribution site is available from a music playback application or, inversely, that a music file downloaded from a music download distribution site is only available on a particular music playback application.

BRIEF SUMMARY OF THE INVENTION

However, in such relationship, when using a music download distribution site, it is necessary for a user to take some active action such as clicking a button or selecting a menu on the music playback application.

Further, when listening to or searching for music on a music download distribution site, a user fails to find desired music without information about the music such as an artist name or a music title. Because it is a necessary condition for searching for music to have information such as an artist name or a music title, a user fails to find desired music if the user does not have such information.

In light of the foregoing, it is desirable to provide novel and improved information processing apparatus, music distribution system, music distribution method and computer program capable of analyzing information about music that is played back by a user and distributing music related to the music to the user, thereby allowing the user to receive the provision of new music without having information about target music such as an artist name or a music title.

According to an embodiment of the present invention, there is provided an information processing apparatus for playing back music data, connected to a distribution server for distributing music data over a network, which includes a music storage portion to store music data, a music playback portion to play back music data, a metadata acquisition portion to acquire metadata describing information about the music data being played back in the music playback portion, a metadata transmission portion to transmit the metadata acquired in the metadata acquisition portion to the distribution server, a music reception portion to receive music data selected in the distribution server based on the information contained in the metadata and distributed from the distribution server, a music acquisition portion to acquire the music data from the music storage portion based on the information contained in the metadata, and a control portion to control the music playback portion to play back the music data distributed from the distribution server and the music data acquired from the music storage portion by the music acquisition portion.

In this configuration, the music storage portion stores music data, the music playback portion plays back music data, the metadata acquisition portion acquires metadata describing information about the music data that is being played back in the music playback portion, and the metadata transmission portion transmits the metadata that is acquired in the metadata acquisition portion to the distribution server. Further, the music reception portion receives music data that is selected in the distribution server based on the information contained in the metadata and distributed from the distribution server, the music acquisition portion acquires the music data from the music storage portion based on the information contained in the metadata, and the control portion controls the music playback portion so as to play back the music data that is distributed from the distribution server and the music data that is acquired from the music storage portion by the music acquisition portion. By receiving music that is distributed based on the information about the music being played back in the information processing apparatus, it is possible for a user to receive the provision of new music without having information about target music such as an artist name or a music title.

The control portion may control the music playback portion so as to sequentially play back the music data distributed from the distribution server and the music data acquired from the music storage portion as music having the same or similar feature. It is thereby possible to enjoy not only the music stored in the music storage portion but also the music distributed from the distribution server as the music having the same or similar feature.

The information processing apparatus may further include a music analysis portion to analyze music data to be played back in the music playback portion and obtain information about the music data. In this configuration, the music analysis portion analyzes music data to be played back in the music playback portion and obtains information about the music data. It is thereby possible to transmit the information that is obtained as a result of analysis in the music analysis portion in the form of metadata to the distribution server.

The music analysis portion may obtain information about a tune of music data, and the metadata acquisition portion may acquire metadata containing the information about the tune. It is thereby possible to transmit the information about a tune of music data that is obtained as a result of analysis in the music analysis portion in the form of metadata to the distribution server. Because the information processing apparatus can receive the distribution of other music with the same tune, it is possible for a user to receive the provision of new music without having information about target music such as an artist name or a music title.

In the information processing apparatus, a playback ratio between the music data prestored in the information processing apparatus and the music data received by the music reception portion may be variable in the music playback portion.

According to another embodiment of the present invention, there is provided an information processing apparatus for playing back content data, connected to another information processing apparatus over a network, which includes a content storage portion to store content data, a content playback portion to play back content data, a metadata acquisition portion to acquire metadata describing information about the content data being played back in the content playback portion, a metadata transmission portion to transmit the metadata acquired in the metadata acquisition portion to the other information processing apparatus, a content reception portion to receive content data selected in the other information processing apparatus based on the information contained in the metadata and transmitted from the other information processing apparatus, a content acquisition portion to acquire the content data from the content storage portion based on the information contained in the metadata, and a control portion to control the content playback portion to play back the content data transmitted from the other information processing apparatus and the content data acquired from the content storage portion by the content acquisition portion.

According to another embodiment of the present invention, there is provided a music distribution system that includes a distribution server for distributing music and an information processing apparatus for playing back music, connected to the distribution server over a network, in which the information processing apparatus includes a music storage portion to store music data, a music playback portion to play back music data, a metadata acquisition portion to acquire metadata describing information about the music data being played back in the music playback portion, a metadata transmission portion to transmit the metadata acquired in the metadata acquisition portion to the distribution server, a music reception portion to receive music data selected in the distribution server based on the information contained in the metadata and distributed from the distribution server, a music acquisition portion to acquire the music data from the music storage portion based on the information contained in the metadata, and a control portion to control the music playback portion to play back the music data distributed from the distribution server and the music data acquired from the music storage portion by the music acquisition portion; and the distribution server includes a music retention portion to retain music, a metadata reception portion to receive the metadata describing information about the music being played back in the information processing apparatus from the information processing apparatus, a music selection portion to select the music retained in the music retention portion based on the information contained in the metadata, and a music distribution portion to distribute the music selected by the music selection portion to the information processing apparatus.

In this configuration, in the information processing apparatus, the music storage portion stores music data, the music playback portion plays back music data, the metadata acquisition portion acquires metadata describing information about the music data that is being played back in the music playback portion, the metadata transmission portion transmits the metadata that is acquired in the metadata acquisition portion to the distribution server, and the music reception portion receives music data that is selected in the distribution server based on the information contained in the metadata and distributed from the distribution server. Further, the music acquisition portion acquires the music data from the music storage portion based on the information contained in the metadata, and the control portion controls the music playback portion so as to play back the music data that is distributed from the distribution server and the music data that is acquired from the music storage portion by the music acquisition portion. In the distribution server, the music retention portion retains music, the metadata reception portion receives the metadata describing information about the music that is being played back in the information processing apparatus from the information processing apparatus, the music selection portion selects the music that is retained in the music retention portion based on the information contained in the metadata, and the music distribution portion distributes the music that is selected by the music selection portion to the information processing apparatus. By distributing music from the distribution server based on the information about the music being played back in the information processing apparatus, it is possible for a user to receive the provision of new music without having information about target music such as an artist name or a music title.

The music selection portion may select music having the same or similar feature as the music being played back in the music playback portion or may select music related to the music being played back in the music playback portion.

The control portion may control the music playback portion so as to sequentially play back the music data distributed from the distribution server and the music data acquired from the music storage portion as music having the same or similar feature. It is thereby possible to enjoy not only the music stored in the music storage portion but also the music distributed from the distribution server as the music having the same or similar feature.

The information processing apparatus may further include a first music analysis portion to analyze music data to be played back in the music playback portion and obtain information about the music data. In this configuration, the first music analysis portion analyzes music data to be played back in the music playback portion and obtains information about the music data. It is thereby possible to transmit the information that is obtained as a result of analysis in the first music analysis portion in the form of metadata to the distribution server.

The first music analysis portion may obtain information about a tune of music data, and the metadata acquisition portion may acquire metadata containing the information about the tune. It is thereby possible to transmit the information about a tune of music that is obtained as a result of analysis in the first music analysis portion in the form of metadata to the distribution server. Because the information processing apparatus can receive the distribution of other music with the same tune, it is possible for a user to receive the provision of new music without having information about target music such as an artist name or a music title.

The distribution server may further include a second music analysis portion to analyze music data retained in the music retention portion and obtain information about a tune, and the music selection portion may select music from the music retention portion so that the tune of the music analyzed in the second music analysis portion matches information about a tune of music contained in the metadata.

According to another embodiment of the present invention, there is provided a music distribution method for distributing music data from a distribution server to an information processing apparatus over a network, which includes the steps of storing music data in the information processing apparatus, playing back music data in the information processing apparatus, acquiring metadata describing information about the music being played back in the playback step in the information processing apparatus, transmitting the metadata acquired in the metadata acquiring step from the information processing apparatus to the distribution server, receiving the metadata describing the information about the music being played back in the information processing apparatus and transmitted in the transmitting step by the distribution server, selecting music to be distributed over the network based on the information contained in the metadata received in the metadata receiving step by the distribution server, distributing the music selected in the music selecting step from the distribution server to the information processing apparatus over the network, acquiring the music data stored in the storing step based on the information contained in the metadata, and controlling music playback to play back the music data distributed from the distribution server and the music data acquired in the music acquiring step.

According to another embodiment of the present invention, there is provided a computer program for playing back music in a computer connected to a distribution server for distributing music over a network, the computer program causing the computer to execute a process including the steps of storing music data, playing back music data, acquiring metadata describing information about the music being played back in the playback step, transmitting the metadata acquired in the metadata acquiring step to the distribution server, receiving music selected in the distribution server based on the information contained in the metadata and distributed from the distribution server, acquiring the music data stored in the storing step based on the information contained in the metadata, and controlling music playback to play back the music data distributed from the distribution server and the music data acquired in the music acquiring step.

According to the embodiments of the present invention described above, there are provided novel and improved information processing apparatus, music distribution system, music distribution method and computer program capable of analyzing information about music that is played back by a user and distributing music related to the music to the user, thereby allowing the user to receive the provision of new music without having information about target music such as an artist name or a music title.

BRIEF DESCRIPTION OF THE DRAWINGS

FIG. 8 is an explanatory view illustrating an example of information registered in the music information database 128 according to one embodiment of the present invention.

FIG. 9 is a flowchart illustrating the process of transmitting music information from the information processing apparatus 200 to the distribution server 100 according to one embodiment of the present invention.

FIG. 10 is a flowchart illustrating the process of distributing music data from the distribution server 100 to the information processing apparatus 200 according to one embodiment of the present invention.

DETAILED DESCRIPTION

Figure 1:
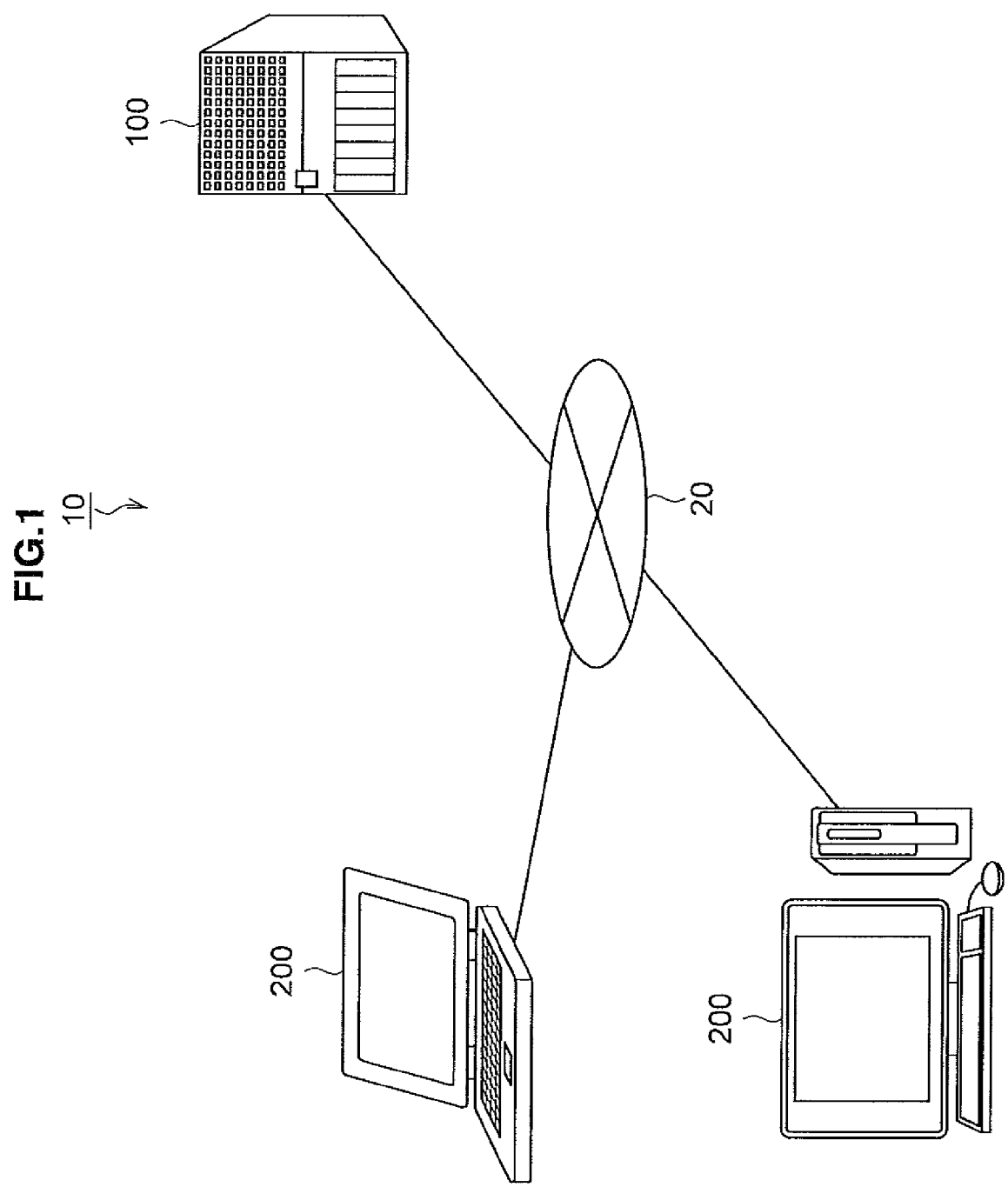
FIG. 1 is an explanatory view illustrating the configuration of a music distribution system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A music distribution system according to one embodiment of the present invention is described firstly.

FIG. 1 is an explanatory view illustrating the configuration of a music distribution system according to one embodiment of the present invention. A music distribution system according to one embodiment of the present invention is described hereinafter with reference to FIG. 1.

FIG. 1 is an explanatory view illustrating the configuration of a music distribution system 10 according to one embodiment of the present invention. The music distribution system 10 distributes music data to a user of the music distribution system 10 over a network 20 that is configured by a network available to the public such as the Internet, a corporate network of a music distribution system operator such as an intranet or the like. Referring to FIG. 1, the music distribution system 10 according to one embodiment of the present invention includes a distribution server 100 and an information processing apparatus 200 such as a personal computer or a music playback device.

The distribution server 100, which is an example of "another information processing apparatus" according to the present invention, stores music data in the form of files and, in response to a request from a user who owns the information processing apparatus 200, distributes music data corresponding to the request over the network 20. The music data may be distributed by transmission of a file or may be distributed in the form of streaming in which distributed music is played back in the information processing apparatus 200 but not stored into the information processing apparatus 200. Further, when the distribution server 100 receives information about music that is being played back in the information processing apparatus 200 from the information processing apparatus 200, the distribution server 100 selects music data to be distributed to the information processing apparatus 200 from the music data that are stored in the distribution server 100 based on the received information and distributes the selected music data to the information processing apparatus 200 via the network 20.

The information processing apparatus 200 may be a desktop personal computer or a notebook personal computer as shown in FIG. 1, for example, and plays back a music file that is created in a format such as MPEG-1 audio layer-3 (MP3) or adaptive transform acoustic coding (ATRAC).

The information processing apparatus 200 requests distribution of music data that is desired by a user to the distribution server 100 over the network 20. Further, when the information processing apparatus 200 plays back music, the information processing apparatus 200 transmits information about the currently played back music to the distribution server 100 via the network 20.

The network 20 is configured by a network available to the public such as the Internet, a corporate network of a music distribution system operator such as an intranet or the like, as described earlier.

Although one distribution server 100 is shown in the music distribution system 10 of FIG. 1, the present invention is not limited thereto, and two or more distribution servers 100 may be placed.

The configuration of the music distribution system according to one embodiment of the present invention is described in the foregoing. In the following, the hardware configuration of the distribution server 100 according to one embodiment of the present invention is described.

Figure 2:
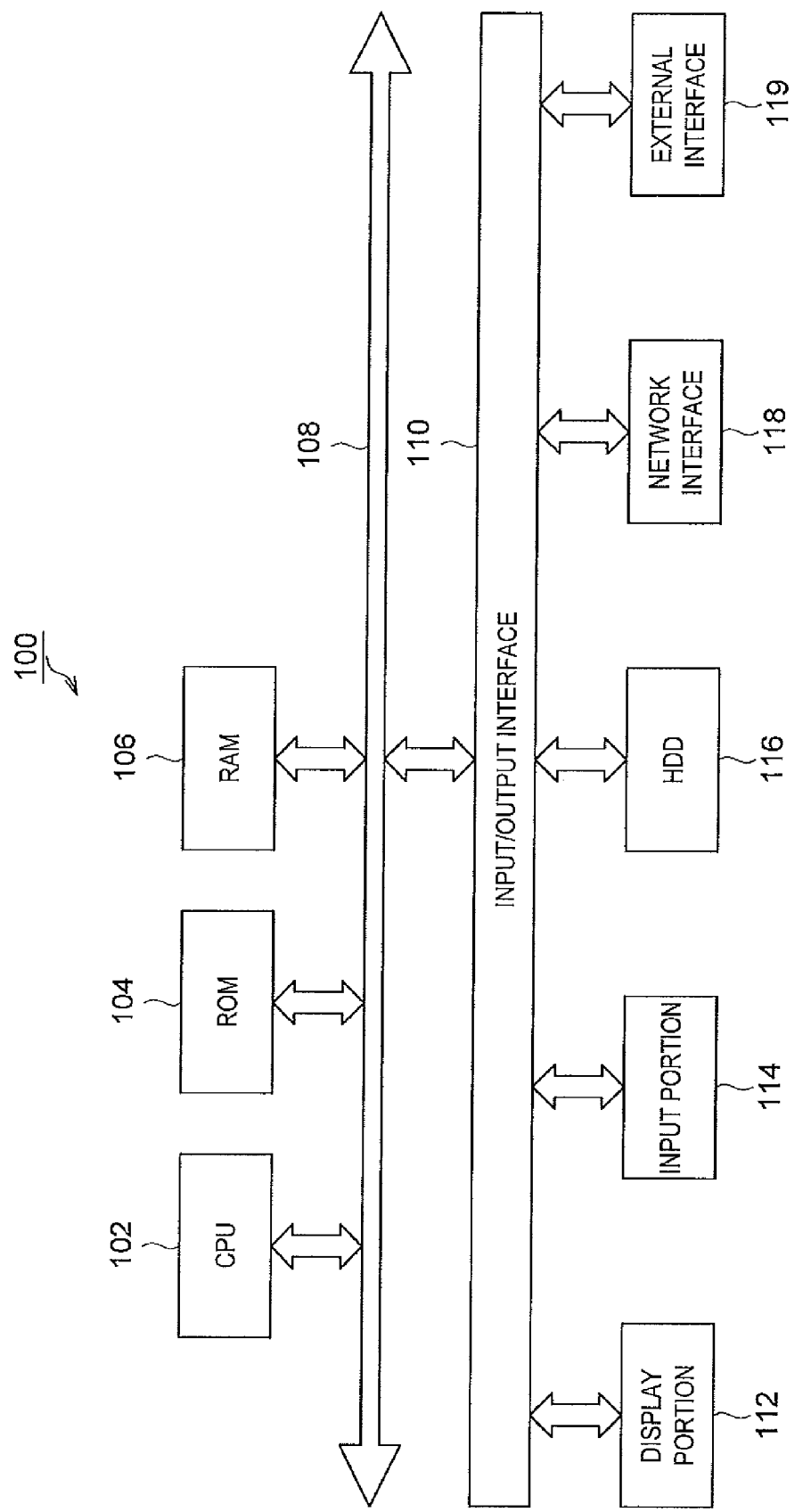
FIG. 2 is an explanatory view illustrating the hardware configuration of a distribution server 100 according to one embodiment of the present invention.

FIG. 2 is an explanatory view illustrating the hardware configuration of the distribution server 100 according to one embodiment of the present invention. The hardware configuration of the distribution server 100 according to one embodiment of the present invention is described hereinafter with reference to FIG. 2.

Referring to FIG. 2, the distribution server 100 according to one embodiment of the present invention includes a central processing unit (CPU) 102, read only memory (ROM) 104, random access memory (RAM) 106, an internal bus 108, an input/output interface 110, a display portion 112, an input portion 114, a hard disk drive (HDD) 116, a network interface 118 and an external interface 119.

The CPU 102 performs numerical calculation, information processing, device control and so on. The CPU 102 performs numerical calculation, information processing and device control by sequentially reading a program stored in the ROM 104 or data stored in the RAM 106, or based on a signal corresponding to a command input via the input portion 114 by an administrator of the distribution server 100, for example, or a signal transmitted via the network interface 118 from the information processing apparatus 200.

The ROM 104 stores fixed data that is basically not altered in programs and operation parameters to be used by the CPU 102 when performing numerical calculation, information processing, device control and so on. The RAM 106 stores data that basically varies during processing in programs and operation parameters to be used by the CPU 102 when performing numerical calculation, information processing, device control and so on.

The internal bus 108 is a path for data exchange inside the distribution server 100. The CPU 102, the ROM 104 and the RAM 106 are connected to each other through the internal bus 108. The internal bus 108 is also connected to the input/output interface 110 and supplies a signal corresponding to a command input via the input portion 114 and a signal transmitted via the network interface 118 from the information processing apparatus 200 that are sent through the input/output interface 110 to the CPU 102.

The input/output interface 110 mediates input and output of information. The input/output interface 110 is connected to the display portion 112, the input portion 114, the HDD 116, the network interface 118 and the external interface 119. The input/output interface 110 is also connected to the internal bus 108 as described above and supplies a signal corresponding to a command input via the input portion 114 and a signal transmitted via the network interface 118 from the information processing apparatus 200 to the CPU 102 through the internal bus 108.

The display portion 112 displays information about an input from the input portion 114, a result of performing numerical calculation, information processing, device control or the like in the CPU 102, and so on. The display portion 112 may be a cathode ray tube (CRT), a liquid crystal display device, an organic electroluminescence (EL) display device or the like, for example.

The input portion 114 is operated by an administrator of the distribution server 100, for example, when inputting various kinds of commands to the CPU 102. The input portion 114 may be a keyboard, a mouse, a touch pad, a pen tablet or the like, for example.

The HDD 116 has a hard disk inside and drives the hard disk to record or play back program or information (e.g. music data) that are read out and executed by the CPU 102.

The network interface 118 is connected to the network 20 and exchanges information with the information processing apparatus 200 or the like over the network 20. The external interface 119 mediates exchange of information with a peripheral device that is connected to the distribution server 100. The external interface 119 may be a universal serial bus (USB) port or the like, for example. An information input device such as a keyboard and a mouse, which is an example of the input portion 114, may be used by being connected to the external interface 119.

The hardware configuration of the distribution server 100 according to one embodiment of the present invention is described in the foregoing with reference to FIG. 2. In the following, the functional configuration of the distribution server 100 according to one embodiment of the present invention is described.

Figure 3:
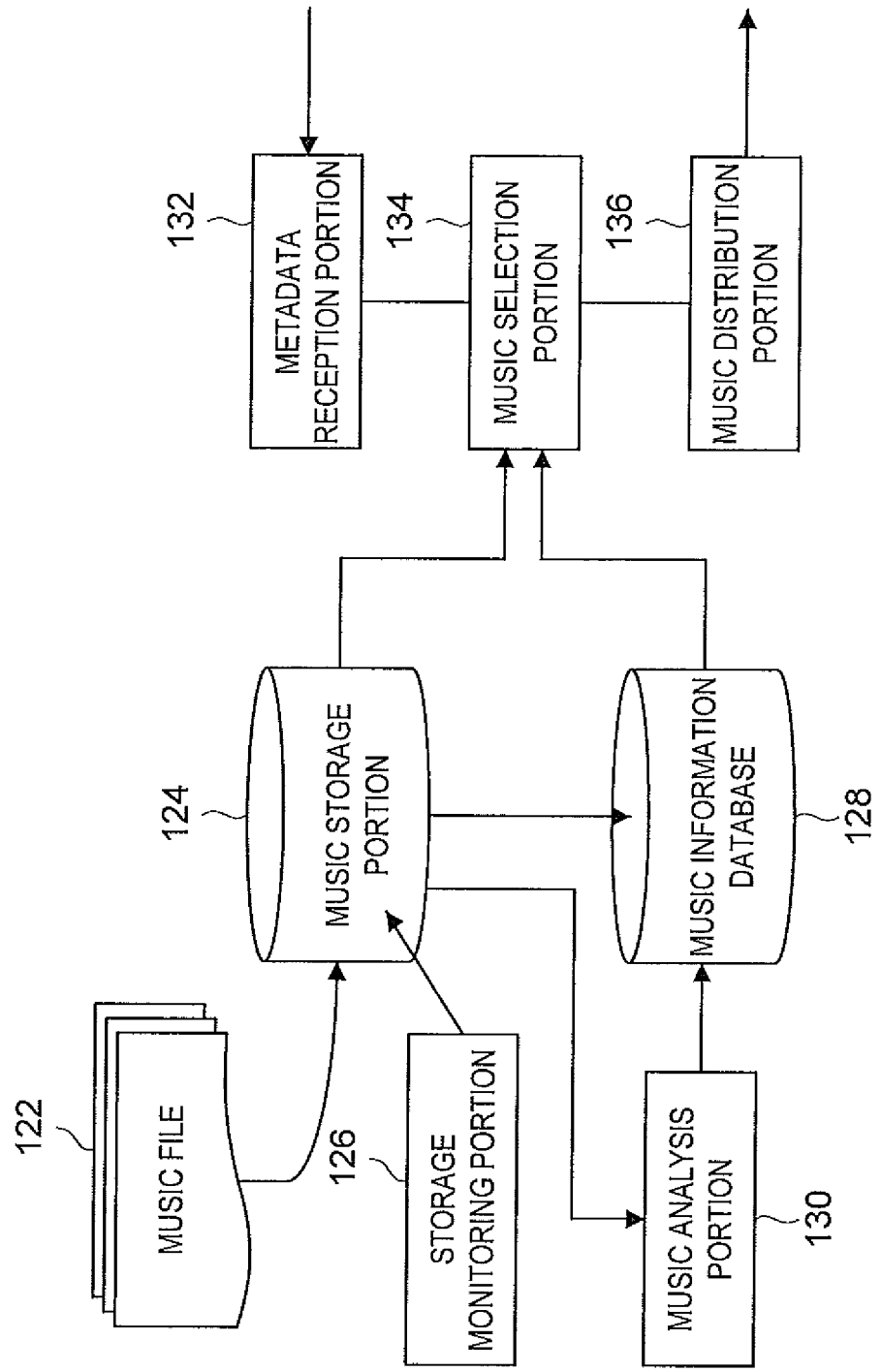
FIG. 3 is an explanatory view illustrating the functional configuration of the distribution server 100 according to one embodiment of the present invention.

FIG. 3 is an explanatory view illustrating the functional configuration of the distribution server 100 according to one embodiment of the present invention. The functional configuration of the distribution server 100 according to one embodiment of the present invention is described hereinafter with reference to FIG. 3.

Referring to FIG. 3, the distribution server 100 according to one embodiment of the present invention includes a music storage portion 124, a storage monitoring portion 126, a music information database 128, a music analysis portion 130, a metadata reception portion 132, a music selection portion 134 and a music distribution portion 136.

The music storage portion 124 stores a music file 122 that is music data converted into a file format. The music file 122 is created by encoding music according to a standard such as MP3 or ATRAC. In the music file 122, music and basic information about the music such as an artist who sings or plays the music, a single or album title that includes the music, a playback time, a lyric writer name, a music composer name, a release year and a genre of the music are recorded. The music storage portion 124 may be a particular folder that is created inside the HDD 116 so as to store the music file 122, for example.

The storage monitoring portion 126 periodically monitors new storage of the music file 122 into the music storage portion 124. When the storage monitoring portion 126 detects that the music file 122 is newly stored into the music storage portion 124, the storage monitoring portion 126 registers basic information (e.g. a music title, an artist name, a single or album title that includes the music etc.) about the newly stored music file 122 into the music information database 128. The storage monitoring portion 126 may be a resident program that is stored in the HDD 116, for example, and programmed to monitor new storage of a music file into a prescribed folder on a regular basis.

The music information database 128 records information about music with respect to the music file 122 that is stored in the music storage portion 124. The music information database 128 is stored inside the distribution server 100, such as in the HDD 116, for example. The music information database 128 also records information about the tune of music that is obtained as a result of analyzing the music file 122 that is newly stored into the music storage portion 124 by the music analysis portion 130, which is described later. The information about the tune of music may be "music suitable for morning wake-up", "heavy rock music" and so on, for example, which are determined by analyzing the tempo, rhythm or the like of music.

Further, the music information database 128 may store a uniform resource locator (URL) on the Internet for purchasing music so as to enable purchase of music from a website on the Internet.

The music analysis portion 130 analyzes the music file 122 that is stored in the music storage portion 124 and obtains information about the tune of music. The information about the tune of music that is obtained as a result of analyzing the music file 122 by the music analysis portion 130 is recorded into the music information database 128.

The processing of analyzing the music file 122 by the music analysis portion 130 may be performed using the technique disclosed in Japanese Patent Application Publication No. 2005-275068, for example. Japanese Patent Application Publication No. 2005-275068 discloses the method that divides an audio signal which is divided into a plurality of frequency ranges (e.g. 12 frequency ranges) into a plurality of octave signals by means of downsampling and analyzes the divided octave signals by means of filtering.

In order to use the technique disclosed in Japanese Patent Application Publication No. 2005-275068, the music analysis portion 130 may include an octave dividing means that performs downsampling of an audio signal by dividing it into a plurality of frequency ranges so as to divide the audio signal into a plurality of octave signals and a filtering means that performs filtering of the divided octave signals.

The metadata reception portion 132 receives metadata that is transmitted from the information processing apparatus 200. As described later, when the information processing apparatus 200 plays back music, it transmits information about the currently played back music (the information about the music that is being played back in the information processing apparatus 200 is referred to hereinafter as "playback music information") to the music distribution server 100 via the network 20. In this embodiment, the playback music information is transmitted to the music distribution server 100 in the form of metadata.

The music selection portion 134 selects music from the music storage portion 124 that stores the music file 122 based on the playback music information, which is information about the music being played back in the information processing apparatus 200, that is contained in the metadata received by the metadata reception portion 132. When selecting music, the music selection portion 134 refers to the music information database 128 and selects music that matches information about the music being played back in the information processing apparatus 200 from the music storage portion 124.

When the music selection portion 134 selects music, it may select music of the same artist from the music storage portion 124. By selecting music of the same artist, a user of the music distribution system 10 might be able to find music of the artist that is unknown to the user, so that the user is provided with new finding.

Besides music of the same artist, the music selection portion 134 may select music of the same feature (e.g. a music tune, a tempo etc.) from the music storage portion 124. By providing music to a user in terms of the tune of music, not limited to the same artist, it is possible to provide a user with significantly new finding about music compared with the case of selecting music of the same artist.

The number of music that is selected by the music selection portion 134 may be one or two or more. The music that is selected by the music selection portion 134 may be the one that is given priority pursuant to a recommendation of a music distributor or a music label. The music selection portion 134 may be in the form of a computer program that is recorded inside the distribution server 100 (e.g. in the HDD 116) and read and executed by the CPU 102.

The music distribution portion 136 distributes the music selected by the music selection portion 134 via the network 20 to the information processing apparatus 200 from which playback music information is transmitted.

When the distribution server 100 distributes music to the information processing apparatus 200, the whole or a part of the music may be distributed. In the case of distributing a part of the music, the part for a prescribed time from the beginning of the music, or the chorus part of the music may be distributed.

The configuration shown in FIG. 3 includes the storage monitoring portion 126, and when the storage monitoring portion 126 detects that the music file 122 is newly stored into the music storage portion 124, basic information about the newly stored music file 122 is recorded into the music information database 128 in this embodiment. The present invention, however, is not limited thereto. For example, when music is stored into the distribution server 100, basic information about the newly stored music file may be recorded into the music information database 128 manually by an administrator of the distribution server 100, and the stored music file may be analyzed using a dedicated program and an analysis result may be recorded into the music information database 128 manually.

The functional configuration of the distribution server 100 according to one embodiment of the present invention is described in the foregoing. In the following, the hardware configuration of the information processing apparatus 200 according to one embodiment of the present invention is described.

Figure 4:
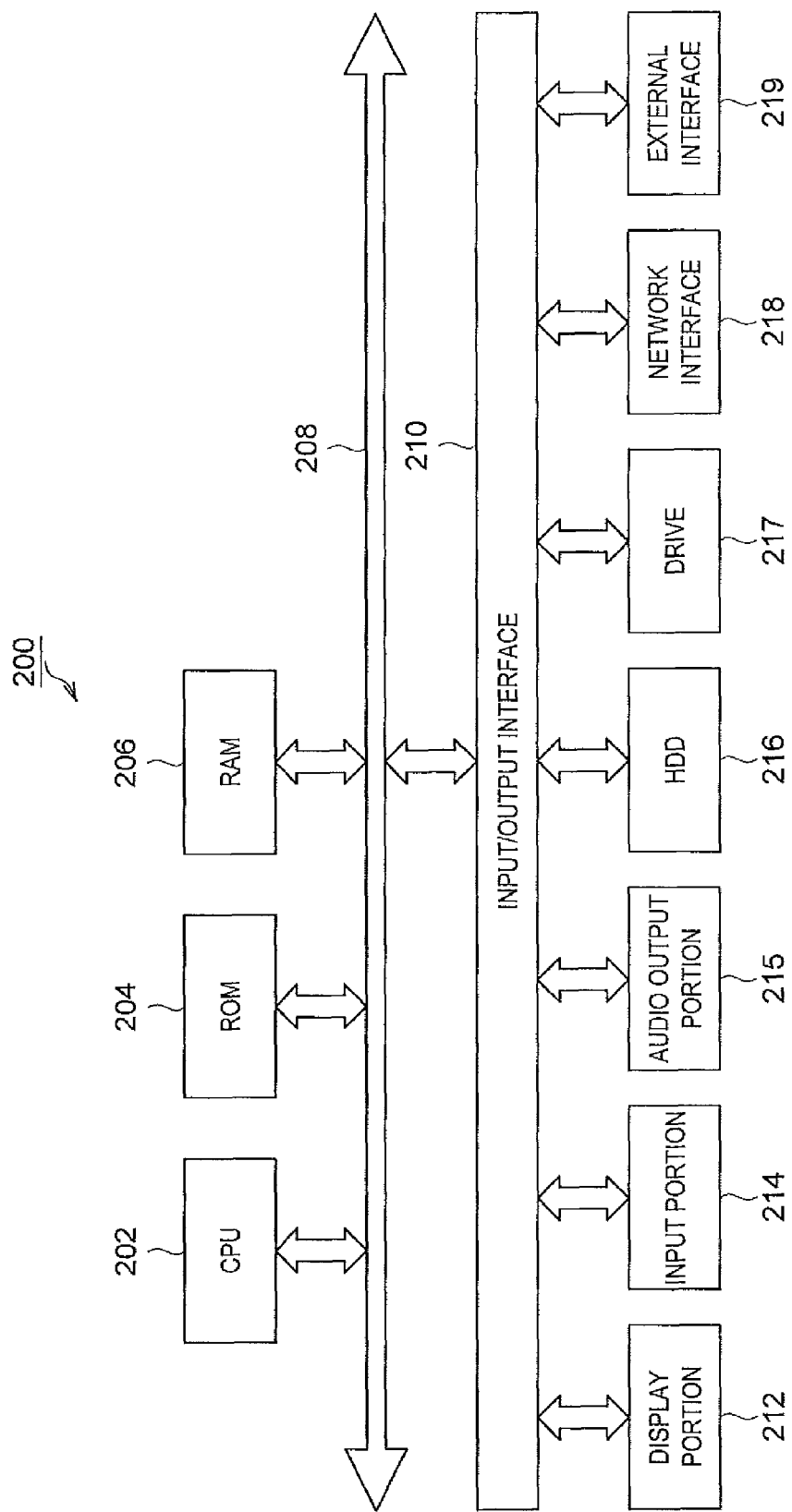
FIG. 4 is an explanatory view illustrating the hardware configuration of an information processing apparatus 200 according to one embodiment of the present invention.

FIG. 4 is an explanatory view illustrating the hardware configuration of the information processing apparatus 200 according to one embodiment of the present invention. The hardware configuration of the information processing apparatus 200 according to one embodiment of the present invention is described hereinafter with reference to FIG. 4.

Referring to FIG. 4, the information processing apparatus 200 according to one embodiment of the present invention includes a CPU 202, ROM 204, RAM 206, an internal bus 208, an input/output interface 210, a display portion 212, an input portion 214, an audio output portion 215, a HDD 216, a drive 217, a network interface 218 and an external interface 219.

The CPU 202 performs numerical calculation, information processing, device control and so on, like the CPU 102 described earlier. The CPU 202 performs numerical calculation, information processing and device control by sequentially reading a program stored in the ROM 204 or data stored in the RAM 206, or based on a signal corresponding to a command input via the input portion 214 by a user of the information processing apparatus 200, for example, or a signal transmitted via the network interface 218 from the distribution server 100.

The ROM 204 stores fixed data that is basically not altered in programs and operation parameters to be used by the CPU 202 when performing numerical calculation, information processing, device control and so on, like the ROM 104 described earlier. The RAM 206 stores data that basically varies during processing in programs and operation parameters to be used by the CPU 202 when performing numerical calculation, information processing, device control and so on, like the RAM 106 described earlier.

The internal bus 208 is a path for data exchange inside the information processing apparatus 200, like the internal bus 108 described earlier. The CPU 202, the ROM 204 and the RAM 206 are connected to each other through the internal bus 208. The internal bus 208 is also connected to the input/output interface 210 and supplies a signal corresponding to a command input via the input portion 214 and a signal transmitted via the network interface 218 from the distribution server 100 that are sent through the input/output interface 210 to the CPU 202.

The input/output interface 210 mediates input and output of information, like the input/output interface 110 described earlier. The input/output interface 210 is connected to the display portion 212, the input portion 214, the audio output portion 215, the HDD 116, the drive 217, the network interface 218 and the external interface 219. The input/output interface 210 is also connected to the internal bus 208 as described above and supplies a signal corresponding to a command input via the input portion 214 and a signal transmitted via the network interface 218 from the distribution server 100 to the CPU 202 through the internal bus 208.

The display portion 212 displays information about an input from the input portion 214, a result of performing numerical calculation, information processing, device control or the like in the CPU 202 and so on, like the display portion 112 described earlier. The display portion 212 may be a CRT, a liquid crystal display device, an organic EL display device or the like, for example.

The input portion 214 is operated by a user of the information processing apparatus 200, for example, when inputting various kinds of commands to the CPU 202. The input portion 214 may be a keyboard, a mouse, a touch pad, a pen tablet or the like, for example.

The audio output portion 215 outputs a sound that is generated when the information processing apparatus 200 executes processing that accompanies the output of a sound. In this embodiment, when playing back music data that is stored in the HDD 216 or distributed from the distribution server 100, music is output from the audio output portion 215, so that a user of the information processing apparatus 200 can enjoy the music.

The HDD 216 has a hard disk inside and drives the hard disk to record or play back program or information (e.g. music data) that are read out and executed by the CPU 202. A portable recording medium is inserted into the drive 217, and data is exchanged between the inserted recording medium and the information processing apparatus 200. A portable recording medium may be a magnetic disk, an optical disk, a magneto-optical disk, a semiconductor memory or the like, and the drive 217 may be a device capable of reading such a recording medium.

The network interface 218 is connected to the network 20 and exchanges information with the distribution server 100 or the like via the network 20. The external interface 219 mediates exchange of information with a peripheral device that is connected to the information processing apparatus 200. The external interface 219 may be a USB port or the like, for example. An information input device such as a keyboard and a mouse, which is an example of the input portion 214, may be used by being connected to the external interface 219.

The hardware configuration of the information processing apparatus 200 according to one embodiment of the present invention is described in the foregoing with reference to FIG. 4. In the following, the functional configuration of the information processing apparatus 200 according to one embodiment of the present invention is descried.

Figure 5:
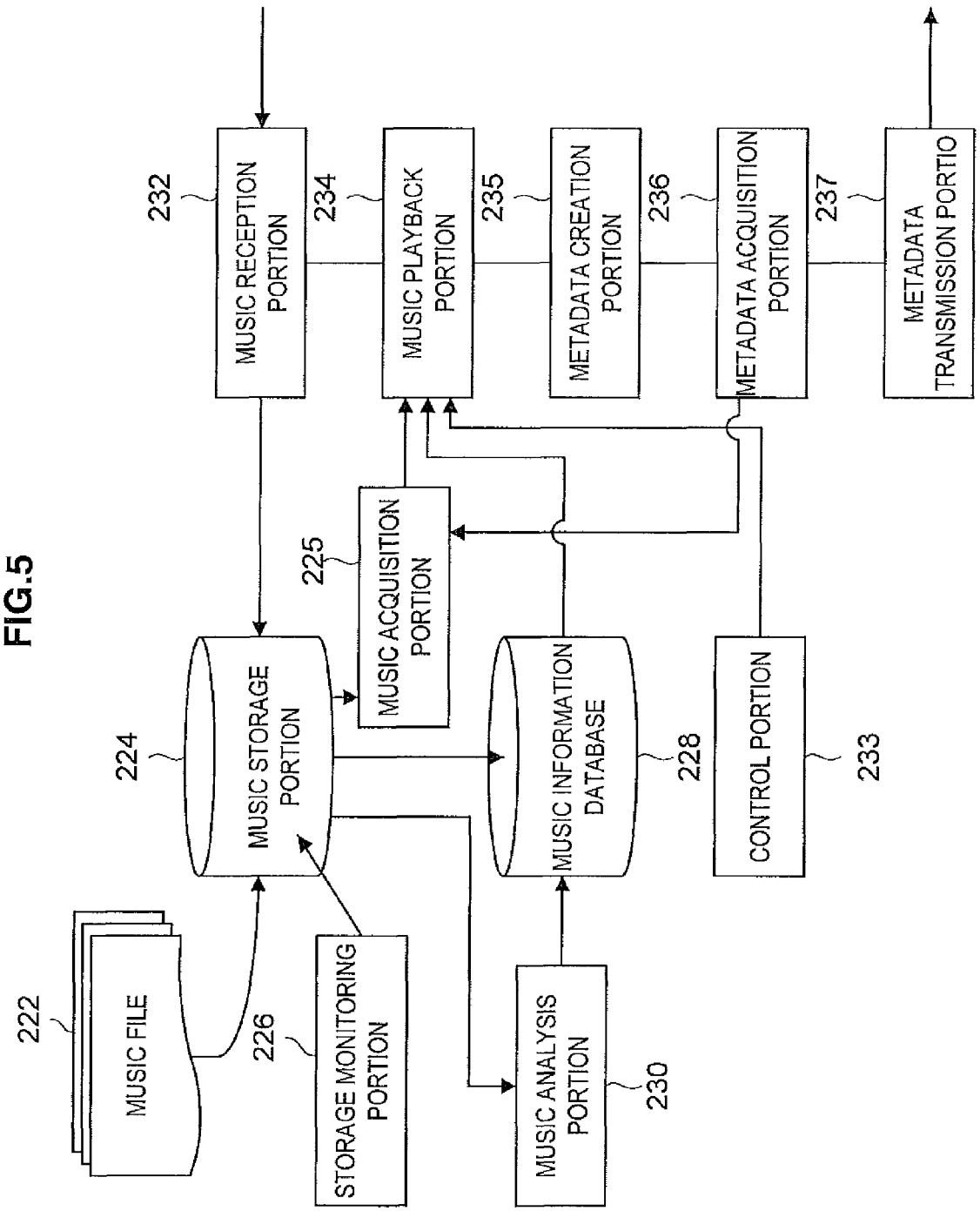
FIG. 5 is an explanatory view illustrating the functional configuration of the information processing apparatus 200 according to one embodiment of the present invention.

FIG. 5 is an explanatory view illustrating the functional configuration of the information processing apparatus 200 according to one embodiment of the present invention. The functional configuration of the information processing apparatus 200 according to one embodiment of the present invention is descried hereinafter with reference to FIG. 5.

Referring to FIG. 5, the information processing apparatus 200 according to one embodiment of the present invention includes a music storage portion 224, a music acquisition portion 225, a storage monitoring portion 226, a music information database 228, a music analysis portion 230, a music reception portion 232, a control portion 233, a music playback portion 234, a metadata creation portion 235, a metadata acquisition portion 236 and a metadata transmission portion 237.

The music storage portion 224, the storage monitoring portion 226, the music information database 228 and the music analysis portion 230 have the similar functions as the music storage portion 124, the storage monitoring portion 126, the music information database 128 and the music analysis portion 130 in the distribution server 100 described earlier.

The music storage portion 224 stores a music file 222 that is music data converted into a file format. The music file 222 is created by encoding music according to a standard such as MP3 or ATRAC. In the music file 222, music and basic information about the music such as an artist who sings or plays the music, a single or album title that includes the music, a playback time, a lyric writer name, a music composer name, a release year and a genre of the music are recorded. The music storage portion 224 may be a particular folder that is created inside the HDD 216 so as to store the music file 222, for example.

The music acquisition portion 225 acquires music data that is stored in the music storage portion 224. In this embodiment, the music acquisition portion 225 acquires music data from the music storage portion 224 based on information contained in metadata that is acquired by the metadata acquisition portion 236, which is described later.

The storage monitoring portion 226 periodically monitors new storage of the music file 222 into the music storage portion 224. When the storage monitoring portion 226 detects that the music file 222 is newly stored into the music storage portion 224, the storage monitoring portion 226 registers basic information (e.g. an artist name, a single or album title etc.) about the newly stored music file 222 into the music information database 228.

The music information database 228 records information about music with respect to the music file 222 that is stored in the music storage portion 224. The music information database 228 is stored inside the information processing apparatus 200, such as in the HDD 216, for example. The music information database 228 also records information about the tune of music that is obtained as a result of analyzing the music file 222 that is newly stored into the music storage portion 224 by the music analysis portion 230, which is described later. The information about the tune of music may be "music suitable for morning wake-up", "heavy rock music" and so on, for example, which are determined by analyzing the tempo, rhythm or the like of music.

The music analysis portion 230 analyzes the music file 222 that is stored in the music storage portion 224 and obtains information about the tune of music. The information about the tune of music that is obtained as a result of analyzing the music file 222 by the music analysis portion 230 is recorded into the music information database 228.

The processing of analyzing the music file 222 in the music analysis portion 230 may be performed using the technique disclosed in Japanese Patent Application Publication No. 2005-275068, for example, like the processing in the music analysis portion 130 described earlier. In order to use the technique disclosed in Japanese Patent Application Publication No. 2005-275068, the music analysis portion 230 may include an octave dividing means that performs downsampling of an audio signal by dividing it into a plurality of frequency ranges so as to divide the audio signal into a plurality of octave signals and a filtering means that performs filtering of the divided octave signals.

The music reception portion 232 receives music data that is distributed from the distribution server 100 over the network 20. The music data that is received by the music reception portion 232 may be stored into the music storage portion 224 so as to be played back by the music playback portion 234, which is described later, or put into the music playback wait state in the music playback portion 234 without being stored into the music storage portion 224.

The control portion 233 controls the music playback portion 234, which is described later, so as to playback the music data that is distributed from the distribution server 100 and the music data that is acquired from the music storage portion 224 by the music acquisition portion 225.

The music playback portion 234 plays back the music file 222 that is stored in the music storage portion 224 and the music data that is distributed from the distribution server 100. The music playback portion 234 is capable of playing back the music having the same or similar feature (e.g. a music tune, a music tempo etc.) in succession. During playback, the music playback portion 234 sequentially plays back the music that is stored in the music storage portion 224 and the music that is distributed from the distribution server 100.

Figure 6:
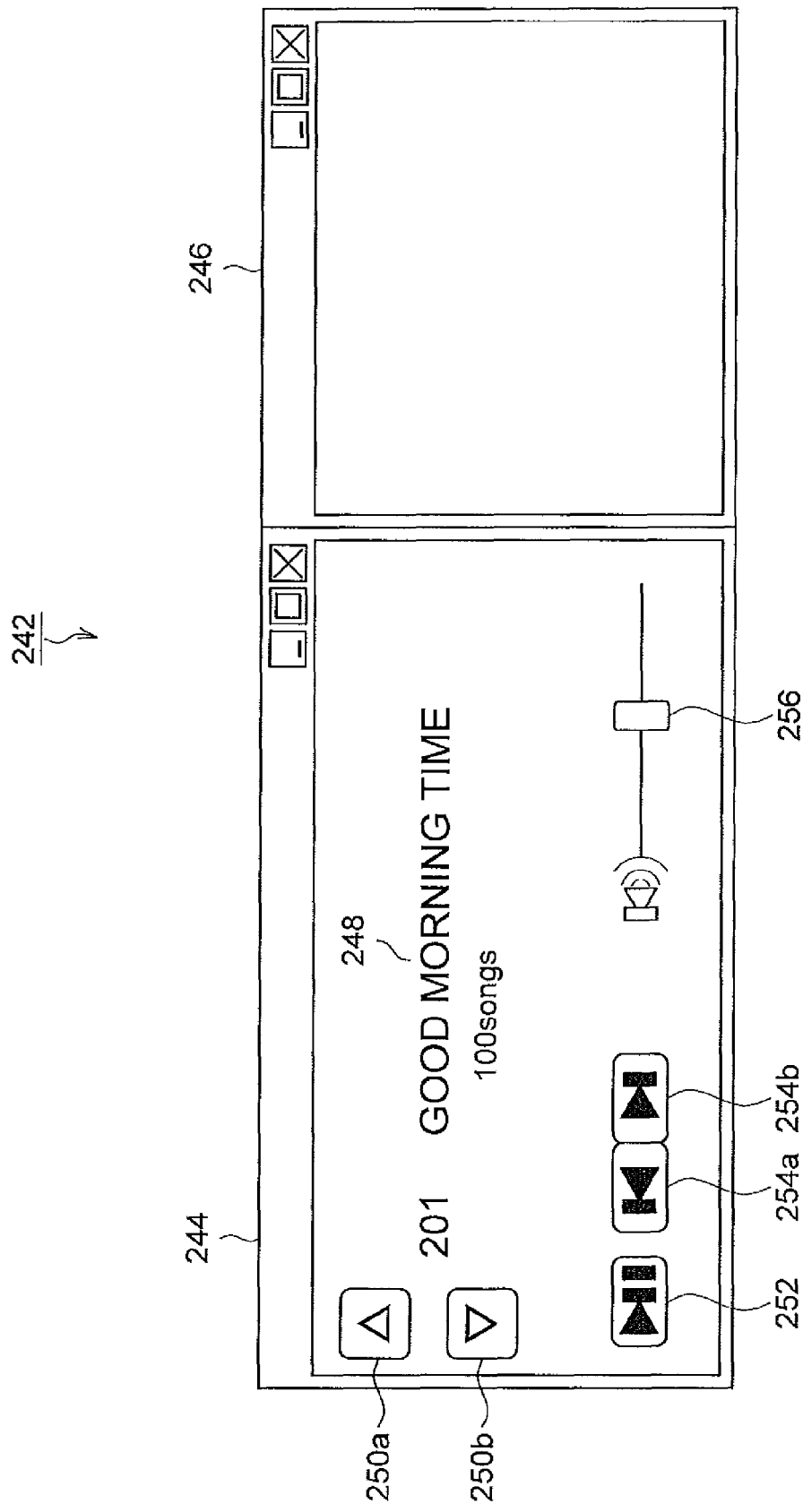
FIG. 6 is an explanatory view illustrating a music playback application 242.

FIG. 6 is an explanatory view illustrating a music playback application 242, which is an example of the music playback portion 234 according to one embodiment of the present invention. The configuration of the music playback application 242 is described hereinafter with reference to FIG. 6.

The music playback application 242 provides music playback function by means of graphical user interface (GUI), and a user of the music playback application 242 can play back music data by manipulating, through mouse clicking or the like, a button or the like that is displayed on the music playback application 242. The music playback application 242 is stored in the HDD 216 of the information processing apparatus 200, for example, and, when activated by a user, the music playback application 242 provides the music playback function. The music playback application 242 includes a music playback window 244 that performs processing related to music playback and a music information window 246 that displays information about the music being played back in the music playback window 244 or the like.

The music playback window 244 is a screen that receives various kinds of user operations related to music playback. The function of each portion of the music playback window 244 is described hereinbelow.

The numeral 248 indicates the channel of music that is played back by the music playback application 242 and the number of pieces of music that belong to the channel. The channel is associated with the feature (e.g. a music tune, a music tempo etc.) of music that is obtained as a result of analysis in the music analysis portion 230. If a certain channel is selected and played back, music data that belong to the selected channel are sequentially played back.

The buttons denoted by 250a and 250b are channel selection buttons for selecting a channel. By manipulating the channel selection buttons denoted by 250a and 250b through mouse clicking or the like, a channel to be played back can be selected.

The button denoted by 252 is a playback/stop button for playing back or stopping music. If the playback/stop button is manipulated through mouse clicking or the like when music is played back, playback of the music stops, and if the playback/stop button is manipulated through mouse clicking or the like when music stops, playback of the music resumes from the part at which the music stops.

The buttons denoted by 254a and 254b are skip buttons for skipping music. If the skip button denoted by 254a is manipulated through mouse clicking or the like, playback starts by skipping to one track before the currently played back music, and if the skip button denoted by 254b is manipulated through mouse clicking or the like, playback starts by skipping to one track after the currently played back music.

The numeral 256 is a volume control portion for controlling the volume of music that is played back by the music playback application 242 through manipulation of a slide bar. By manipulating the volume control portion, the volume of the music that is output from the audio output portion 215 can be controlled.

The function of each portion of the music playback window 244 is described above.

The music information window 246 displays information about the music being played back in the music playback window 244 or the like. For example, if the music being played back in the music playback window 244 is music that is distributed from the distribution server 100, a website on the Internet for purchasing the music or an album including the music may be displayed as the information displayed in the music information window 246.

The configuration of the music playback application 242 is described in the foregoing.

The metadata creation portion 235 creates playback music information in the form of metadata in order to transmit playback music information in the form of metadata to the distribution server 100 while music is being played back in the music playback portion 234. The metadata that is created in the metadata creation portion 235 is acquired by the metadata acquisition portion 236. The metadata that is acquired by the metadata acquisition portion 236 is supplied to the metadata transmission portion 237. The playback music information includes information such as an artist name, a music title, an album name, a channel name corresponding to the tune, a lyric writer name, a music composer name, a release year and a genre of the music being played back.

The metadata acquisition portion 236 acquires the metadata that is created by the metadata creation portion 235. The metadata that is acquired by the metadata acquisition portion 236 is sent out to the network 20 from the metadata transmission portion 237.

The metadata transmission portion 237 transmits the metadata of the playback music information that is generated in the music playback portion 234 to the distribution server 100 via the network 20. By transmitting the playback music information from the information processing apparatus 200 to the distribution server 100, the distribution server 100 can analyze the playback music information and select the music to be distributed to the information processing apparatus 200 from which the playback music information is transmitted.

The destination of transmitting metadata from the metadata transmission portion 237 is previously registered in the information processing apparatus 200. For example, URL of the distribution server 100 may be specified by the setting of the music playback application 242, and the metadata may be transmitted to the specified URL of the distribution server 100 from the metadata transmission portion 237.

The functional configuration of the information processing apparatus 200 according to one embodiment of the present invention is described in the foregoing. In the following, the operation of the music distribution system 10 according to one embodiment of the present invention is described. The process of registering music information into the music information database 128 in the distribution server 100 is described firstly.

Figure 7:
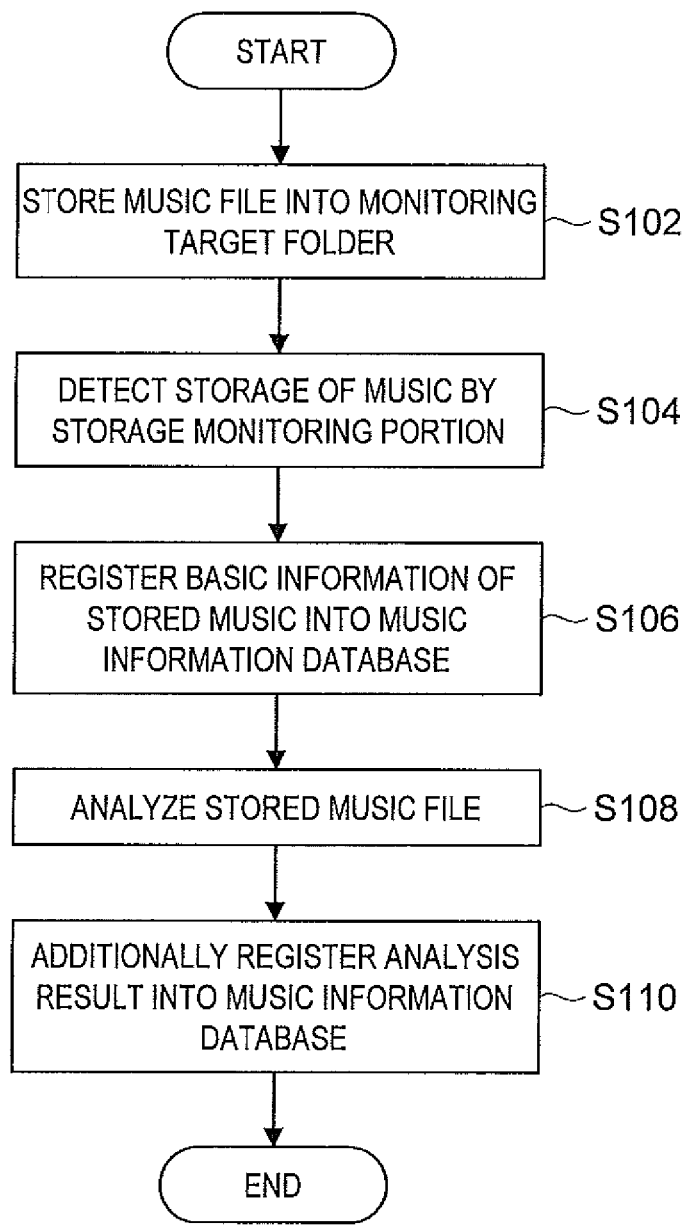
FIG. 7 is a flowchart illustrating the process of registering music information into a music information database 128 according to one embodiment of the present invention.

FIG. 7 is a flowchart illustrating the process of registering music information into the music information database 128 according to one embodiment of the present invention. The process of registering music information into the music information database 128 according to one embodiment of the present invention is described hereinafter with reference to FIG. 7.

First, the music file 122 is stored into a monitoring target folder as the music storage portion 124 to be monitored by the storage monitoring portion 126 (step S102). When the music file is stored into the monitoring target folder, the storage monitoring portion 126 detects new storage of music into the monitoring target folder (step S104).

When the storage monitoring portion 126 detects new storage of music into the monitoring target folder, basic information of the newly stored music is registered into the music information database 128 (step S106). The basic information of music contains a music title, an artist name, a single or album title including the music and so on, as described earlier.

After the basic information of the newly stored music is registered into the music information database 128, the music analysis portion 130 analyzes the newly stored music and obtains information about the tune of the music (step S108). Then, the analysis result of the music in the music analysis portion 130 is additionally registered into the music information database 128 (step S110).

FIG. 8 is an explanatory view illustrating an example of information that is registered in the music information database 128 according to one embodiment of the present invention. In the example of FIG. 8, information that contains a music title, an artist name, an album including the music, a channel to which the music belongs that is obtained as a result of analyzing the music, a distribution priority of the music, URL for purchasing the music is registered in the music information database 128.

The URL for purchasing the music may be manually input after music information is registered into the music information database 128, or it may be registered by a computer program that automatically registers URL retrieved by searching the Internet based on an artist name, an album title or the like.

The process of registering music information into the music information database 128 according to one embodiment of the present invention is described in the foregoing. Although the process of registering music information into the music information database 128 in the distribution server 100 is described above, the process of registering music information into the music information database 228 in the information processing apparatus 200 is also performed in the same manner as shown in FIG. 7. In the music information database 228 in the information processing apparatus 200, information necessary for music distribution such as a distribution priority of music, URL for purchasing music may not be stored.

The process of transmitting music information from the information processing apparatus 200 to the distribution server 100 according to one embodiment of the present invention is described next. FIG. 9 is a flowchart illustrating the process of transmitting music information from the information processing apparatus 200 to the distribution server 100 according to one embodiment of the present invention.

Firstly, the music playback portion 234 in the information processing apparatus 200 starts playback of the music file 222 that is stored in the music storage portion 224 (step S112). After the music playback portion 234 starts playback of the music file 222, it acquires playback music information by reading information about the currently played back music from the music information database 228 (step S114). The playback music information acquired in this step may contain information about a channel to which the music belongs in addition to basic information of the music such as a music title, an artist name and an album title including the music.

After acquiring the playback music information by reading information about the music from the music information database 228, the metadata creation portion 235 creates metadata from the acquired playback music information (step S116). The metadata that is created in the metadata creation portion 235 is acquired by the metadata acquisition portion 236 (step S118), and the metadata that is acquired by the metadata acquisition portion 236 is transmitted from the metadata transmission portion 237 to the distribution server 100 (step S120). The destination of transmitting the metadata of the playback music information from the metadata transmission portion 237 is previously set to the information processing apparatus 200 as described above. The metadata transmission portion 237 transmits the metadata of the playback music information to the specified location.

The process of transmitting music information from the information processing apparatus 200 to the distribution server 100 according to one embodiment of the present invention is described in the foregoing. The process of distributing music data from the distribution server 100 to the information processing apparatus 200 according to one embodiment of the present invention is described below.

FIG. 10 is a flowchart illustrating the process of distributing music data from the distribution server 100 to the information processing apparatus 200 according to one embodiment of the present invention. The process of distributing music data from the distribution server 100 to the information processing apparatus 200 according to one embodiment of the present invention is described hereinafter with reference to FIG. 10.

In the process of distributing music data from the distribution server 100 to the information processing apparatus 200, the metadata reception portion 132 first receives metadata of playback music information that is transmitted from the information processing apparatus 200 (step S122).

After receiving the metadata of the playback music information that is transmitted from the information processing apparatus 200, the music selection portion 134 analyzes the received metadata of the playback music information. The music selection portion 134 analyzes the metadata of the playback music information and acquires a music file or a music list of a channel that matches the channel to which the music belongs that is contained in the metadata of the playback music information from the music storage portion 124 (step S124). The music list is a collection of a plurality of music files. Thus, the music selection portion 134 may select a single music file or a plurality of music files.

In the case of selecting a plurality of pieces of music, the music selection portion 134 may select music with a high priority that is registered in the music information database 128. Further, in the case of selecting a plurality of pieces of music, it is preferred to set an upper limit to the number of pieces of music to be selected in order to prevent distribution of a large number of pieces of music at a time to the information processing apparatus 200.

After the music selection portion 134 acquires a music file or a music list from the music storage portion 124, the music distribution portion 136 distributes the acquired music file or music list to the information processing apparatus 200 from which the metadata of the playback music information is transmitted (step S126). The distributed music file or music list reaches the information processing apparatus 200 through the network 20.

Although the music file is distributed to the information processing apparatus 200 when the music distribution portion 136 performs distribution in the above-described step S126 in this embodiment, the present invention is not limited thereto. For example, so-called streaming distribution in which the distributed music is played back in the information processing apparatus 200 but not stored into the information processing apparatus 200 may be performed. When performing the streaming distribution, metadata that describes information about distributed music may be transmitted from the distribution server 100 to the information processing apparatus 200.

By receiving the distribution of music data from the distribution server 100, the information processing apparatus 200 can play back not only the music file that is stored in the music storage portion 224 but also the music data that is distributed over the network in the music playback portion 234. When the music playback portion 234 plays back music, the control portion 233 makes control so as to play back the music file stored in the music storage portion 224 and the music data distributed over the network which have the same or similar feature (e.g. the same channel). The music file stored in the music storage portion 224 is acquired by the music acquisition portion 225, and the acquired music data is played back in the music playback portion 234.

When the music selection portion 134 selects a music file or a music list, it may select music of the same artist, besides music belonging to the same channel as the music being played back in the information processing apparatus 200.

Further, when the music playback portion 234 plays back music by specifying a channel, the playback ratio between the music belonging to the specified channel that is stored locally (i.e. stored in the music storage portion 224) and the music belonging to the specified channel that is distributed over the network may be set. The playback ratio may be set from a setting screen of the music playback application 242 or may be determined arbitrarily in the music distribution end by distributing information about the playback ratio between the music stored locally and the music distributed over the network from the distribution server 100 to provide music, for example.

Furthermore, when the distribution server 100 distributes music data to the information processing apparatus 200, it may distribute information about URL for purchasing the music in addition to the music data. By distributing the information about URL for purchasing the music in addition to the music data, it is possible to display a website on the Internet for purchasing the music or an album including the music in the music information window 246 when playing back the distributed music in the music playback application 242 that is executed in the information processing apparatus 200. If a user likes the distributed music, the user can purchase the music or the album including the music from the displayed website.

The process of distributing music data from the distribution server 100 to the information processing apparatus 200 according to one embodiment of the present invention is described in the foregoing.

As described above, according to one embodiment of the present invention, the distribution server 100 analyzes metadata of playback music information that is transmitted from the information processing apparatus 200, selects music belonging to the same channel as the music being played back in the information processing apparatus 200, and distributes the music data to the information processing apparatus 200 from which the metadata of the playback music information is transmitted, thereby allowing a user of the information processing apparatus 200 to find new music.

It should be understood by those skilled in the art that various modifications, combinations, sub-combinations and alterations may occur depending on design requirements and other factors insofar as they are within the scope of the appended claims or the equivalents thereof.

For example, although when the information processing apparatus 200 transmits metadata of playback music information to the distribution server 100, the metadata is created by acquiring the playback music information about the currently played back music from the music information database in the above-described embodiment, the present invention is not limited thereto. For example, a record of the music that has been played back in the music playback portion 234 may be held inside the information processing apparatus 200 (e.g. in the HDD 216), and the record of the played back music may be transmitted in the form of metadata from the metadata transmission portion 237 to the distribution server 100.

Then, receiving the record of the music that has been played back in the music playback portion 234 from the information processing apparatus 200, the distribution server 100 may select music to be distributed to the information processing apparatus 200 based on the received record by means of the music selection portion 134. For example, if the rate of playing back Japanese music is high, the music selection portion 134 may select a relatively large number of pieces of Japanese music that belong to the channel of the music being played back in the music playback portion 234 from the music storage portion 124 of the distribution server 100, and if the rate of playing back classical music is high, the music selection portion 134 may select a relatively large number of pieces of classical music that belong to the channel of the music being played back in the music playback portion 234 from the music storage portion 124 of the distribution server 100.

Further, in the case of performing streaming distribution in which music data is not stored into the information processing apparatus 200 when distributing music from the distribution server 100, the record of the music that has been distributed from the distribution server 100 and information (e.g. a music title, an artist name, an album title, a channel to which the music belongs etc.) about the music that has been distributed from the distribution server 100 and played back may be held inside the information processing apparatus 200 (e.g. in the HDD 216), so that they can be referred to from an application or the like (e.g. the music playback application 242) later. By enabling reference to the record of the music that has been distributed from the distribution server 100, a user can check information about the music that is distributed by streaming, so that it is possible to find out a music title when a user forgets the title of the music which the user likes.

Although metadata that describes information about music to be played back is created in the metadata creation portion 235 and the created metadata is transmitted from the metadata transmission portion 237 when playing back the music in the information processing apparatus 200 in the above-described embodiment, the present invention is not limited thereto. For example, metadata that describes information about music may be created in advance before playing back music in the information processing apparatus 200, and upon playback of the music, the metadata that describes information about the music to be played back may be acquired by the metadata acquisition portion 236 and transmitted from the metadata transmission portion 237.

Further, although the case where data that is handled in the music distribution system 10 is music data is described in the above-described embodiment, the present invention is not limited thereto. For example, instead of music data, content data such as animation data and video data may be distributed and played back in the information processing apparatus 200. In such a case, besides the feature of music (e.g. a music tune and a music tempo) that is obtained as a result of analysis in the music analysis portion 230, the feature of an image (e.g. a color, a subject etc.) that is obtained by analyzing the image of animation data or video data may be stored as information about moving images. Then, content data having the same or similar feature as the content data played back in the information processing apparatus 200 may be received from the distribution server 100, thereby improving the content availability for a user.

Furthermore, although the music distribution system 10 in which the distribution server 100 and the information processing apparatus 200 are connected over the network is described in the above-described embodiment, the present invention is not limited thereto. For example, an information processing apparatus and another information processing apparatus may be connected to a home network, or an information processing apparatus and another information processing apparatus may be directly connected via peer to peer (P2P) to exchange content data between the information processing apparatus and the other information processing apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A distribution server comprising:
    circuitry configured to control:
        receiving metadata of content data being played back from an information processing apparatus, wherein the metadata is generated based on analyzing the content data and identifying a feature in the content data;
        determining related content data based on the metadata of the content data, wherein the related content data includes the same or similar feature as the feature in the content data, wherein the related content data is not stored in the information processing apparatus and wherein the related content data is determined from a channel to which the content data belongs according to a determination of a rate of playing back by the information processing apparatus of given content data determined to include the same or similar feature as the feature in the content data; and
        transmitting the related content data to the information processing apparatus, wherein the information processing apparatus selectively plays back the content data and the related content data.

2. The distribution server according to claim 1, wherein the metadata is generated based on playback of the content data at the information processing apparatus.

3. The distribution server according to claim 1, wherein the content data and the related content data are sequentially played back at the information processing apparatus.

4. The distribution server according to claim 1, wherein the analyzing of the content data includes analyzing the feature of the content data.

5. The distribution server according to claim 1, wherein the circuitry is configured to control:
    analyzing second content data stored external to the information processing apparatus and obtaining information about a first feature of the second content data; and
    selecting the related content data included in the second content data so that the first feature matches information about a second feature of the content data indicated by the metadata.

6. A method for distribution comprising:
    receiving metadata of content data being played back from an information processing apparatus, wherein the metadata is generated based on analyzing the content data and identifying a feature in the content data;
    determining related content data based on the metadata of the content data, wherein the related content data includes the same or similar feature as the feature in the content data, wherein the related content data is not stored in the information processing apparatus and wherein the related content data is determined from a channel to which the content data belongs according to a determination of a rate of playing back by the information processing apparatus of given content data determined to include the same or similar feature as the feature in the content data; and
    transmitting the related content data to the information processing apparatus, wherein the information processing apparatus selectively plays back the content data and the related content data.

7. A non-transitory computer-readable medium storing a computer program, the program comprising:
    receiving metadata of content data from an information processing apparatus, wherein the metadata is generated based on analyzing the content data and identifying a feature in the content data;
    determining related content data based on the metadata of the content data, wherein the related content data includes the same or similar feature as the feature in the content data, wherein the related content data is not stored in the information processing apparatus and wherein the related content data is determined from a channel to which the content data belongs according to a determination of a rate of playing back by the information processing apparatus of given content data determined to include the same or similar feature as the feature in the content data; and transmitting the related content data to the information processing apparatus, wherein the information processing apparatus selectively plays back the content data and the related content data.

\* \* \* \* \*